UNITED STATES PATENT OFFICE.

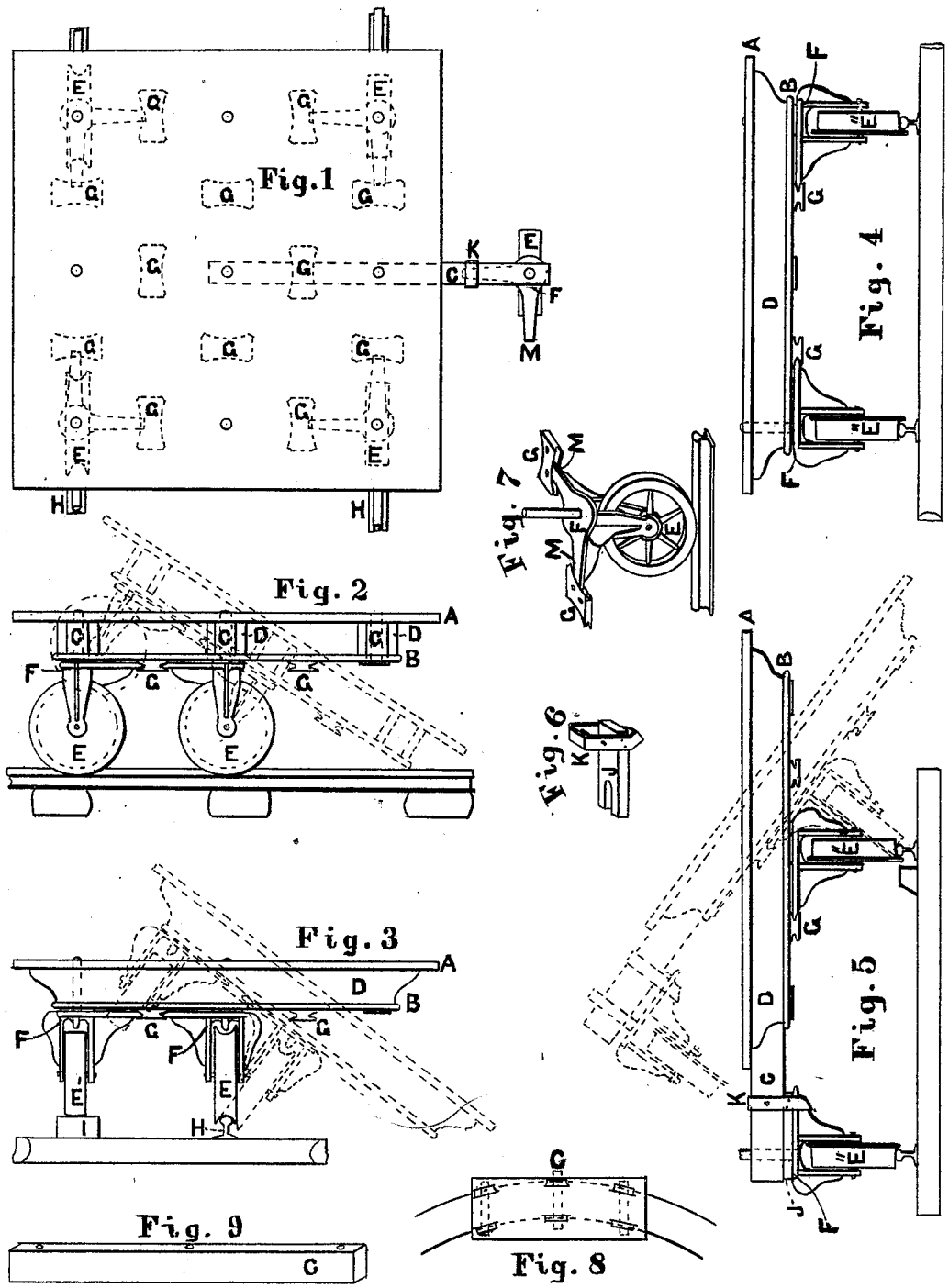

ISAAC B. HOWE, OF CLINTON, IOWA.

IMPROVEMENT IN DUMPING-CARS.

Specification forming part of Letters Patent No. 174,960, dated March 21, 1876; application filed December 7, 1875.

*To all whom it may concern:*

Be it known that I, ISAAC B. HOWE, of Clinton, in the county of Clinton and State of Iowa, have invented a new and useful Improvement in Railway-Cars, which improvement is fully set forth in the following specification, reference being had to the accompanying drawings.

The objects of my invention are to make a railway-car which can be run on curves of shorter radius and with less friction than ordinary cars, either with wheels under the ends of the car only, or with additional wheels between the end wheels, when required for the support of long cars, to be used as a dumping or non-dumping car, and be of much less height than the ordinary dumping-cars, and to be easily adjusted to run on tracks of different gage, or on a single-rail track with light and inexpensive auxiliary rail or rails for balancing the car only. These advantages are secured by means of changing the location of the wheels and their supports, and by using unflanged, single-flanged, or double-flanged wheels, as the nature of the service requires, by inclining the wheels and their bearings with the car in dumping, and by using revolving pedestals with independent axles for each wheel when the car is to be used on curves of short radius.

The same letters in all figures indicate the same objects.

The drawings show the construction of a small car to be moved by hand or horse power for quarries, mines, ditching, railway-cuts, and similar purposes.

Figure 1 shows a plan of the top of floor of the car, with one of the slide-beams C drawn out to show the top of a wheel, E, wheel-pedestal F, and pedestal-arm fastening K. The dotted lines show the location of the wheels, pedestals, and pedestal sockets or fastenings, when the car is used as a platform or non-dumping car on a common two rail track. The dotted circles show the different locations in which the wheels can be placed for different kinds of service. Fig. 2 gives a side view of the car when used as an end-dumper. Fig. 3 gives an end view of the car on a single-rail track, H, with one auxiliary or balancing rail support, I, with the car dumping at the side. Fig. 4 gives an end view of the car as a non-dumper, on a common two-rail track. Fig. 5 gives an end view of the car as a side-dumper on a common two-rail track, the center of the car being over one rail, and the slide-beams C, with wheels affixed to their ends, drawn out to balance the car on the opposite rail, or as shown at C, Fig. 1. Fig. 6 gives a perspective view of the strap or clamp K, which holds the arm of the wheel-pedestal in place on the end of the slide-beam C, when drawn out to balance the car on the second rail, as shown in Fig. 5. J is a bifurcated block or "shim," attached to clamp K under the end of the slide-beam C, to make the height of the platform the same as over the other wheels. Fig. 7 gives a perspective view of a double-flanged wheel, E, pedestal F, and sockets G, for holding the pedestal-arms in place, while allowing the wheel to adjust itself to any curve. Fig. 8 gives a plan of a car with center wheels on a curved track, the slide-beam C supporting the center wheels, being permitted to freely move laterally to enable the wheels to accommodate themselves to the curvature of the track. Fig. 9 gives a perspective view of the slide-beam C, with the holes for receiving the pivots of the wheel-pedestals.

The sills D of the cars are placed in pairs to form guides for the slide-beams C. The under side of the sills are ceiled or floored, as shown at B, Fig. 2, to hold the slide-beams up in place, and form supports for the pedestals F and the sockets G, which hold the pedestal-arms M in place. The sockets G are grooved on the arc of a circle to receive the ends of the pedestal-arms M, and are bolted to the under floor B. For cars of suitable size for hand or horse power, these sockets may be double-faced, so that each socket will hold an arm of two pedestals.

The wheel-pedestals are made to revolve like casters, to accommodate each wheel to the curvature of the track; or they may be made to use two wheels in one pedestal; or, when there is not enough curvature of track to cause friction or danger, they may be fixed or rendered rigid by fastening their arms, so as to prevent their revolving.

The axis or pivot of the pedestal passes through the under floor B and the slide-beams C, and may also pass through the top floor A of the car. Collars may be attached to the floors to give additional support to the pedestals.

When the wheel-bearing pedestals are placed in position they hold the slide-beams from moving. When it is desired to permit the slide-beams to move, as would be the case with center bearing-wheels under a long car, a slot or opening is made in the under floor for the movement of the pedestal, and the pedestal is fastened to the slide-beam only.

Operation: To use the car on a common railway, have single-flanged or common car-wheels, and fasten the pedestal-arms so that the pedestals cannot revolve. To work it as a platform-car, place the wheels at the four corners of the car. To use it as an end-dumper, place the two wheels at the center of the sides of the car, and two at the end opposite to that from which it is desired to dump, as shown in Fig. 2. Load so that car will not dump of itself, but have the principal weight bear on the center wheels. To dump at the side, place two wheels at the center of the ends of the car, (two on the end of two slide-beams,) have the center wheels and center of the car over one rail, and draw out one or two slide-beams and fasten them, so that their wheels will rest on the opposite rail, as shown in Fig. 5. Load so that the wheels on the end of the slide-beam will carry only enough weight to prevent self-dumping.

At the point of dumping a piece of plank or rail may be spiked to ties, as shown in Fig. 5, to keep the single-flanged wheels under the center of the car from sliding off the rail.

To use the car on a single main-rail track, with either one or two side supports—if on track without hard curves, single-flanged wheels may be used, and the car operated the same as on an ordinary railway; but on curves of very short radius use double-flanged guide-wheels, with pivoted pedestals on the main rail, and unflanged balancing-wheels on the auxiliary rails, so as to avoid friction in curving. Have the gage of the outside or auxiliary rails right for the outside wheels of the car, and the main rail in the center, as shown at Fig. 3.

For a platform or non-dumping car, place a double-flanged guide-wheel under the center of each end of the car, over the main rail, and a balancing-wheel under the center of each side of the car, or in either of the other locations, as may be most convenient.

For dumping, change the location of wheels, as on ordinary two-rail track. At the dumping-point, a depression of the end of the track, for end-dumping, or a depression of one rail or elevation of the opposite rail, for side-dumping, will cause the car to dump without assistance, and I have found by experiments with heavy loads on this car that, inclining the wheels with the car, for dumping, will not throw the main wheels from the rail or strain or injure the car.

I claim as my invention—

1. In a railway-car for a single-rail track, the pivoted pedestal F, in combination with the double-flanged wheel E, arranged substantially as described.

2. The brace-arms M M, or their equivalents, on the pivoted pedestal F, with or without the grooved sockets G, substantially as and for the purposes described.

3. In combination with the pedestal F and arms M M, the grooved guides G, or their equivalents, arranged substantially as and for the purposes described.

4. In a dumping railway-car, the sliding adjustable beams C C, arranged substantially as described.

5. In combination with the sliding beam C and pedestal F, the clamp K, or its equivalent, substantially as and for the purposes described.

ISAAC B. HOWE.

Witnesses:
T. N. BOUTELLE,
W. W. SANBORN.